US005465688A

United States Patent [19]
Hatcher

[11] Patent Number: 5,465,688
[45] Date of Patent: Nov. 14, 1995

[54] PIG HOLDER

[76] Inventor: Donald Hatcher, Rte. 2, Box 283-1, Wallace, N.C. 28466

[21] Appl. No.: 72,226

[22] Filed: Jun. 7, 1993

[51] Int. Cl.$^6$ ............................................. A01K 15/06
[52] U.S. Cl. ........................................ 119/728; 119/755
[58] Field of Search ................................ 119/728, 716, 119/712, 753, 755, 756, 757; 452/54, 187, 189, 190

[56] References Cited

U.S. PATENT DOCUMENTS

| | | | |
|---|---|---|---|
| 3,483,846 | 12/1969 | Quint | 119/728 |
| 3,693,595 | 9/1972 | Stewart | 119/728 |
| 3,717,128 | 2/1973 | Pearman et al. | 119/757 |
| 3,892,204 | 7/1975 | Belkin | 119/755 |
| 4,223,639 | 9/1980 | Korkowski | 119/728 |
| 4,274,366 | 6/1981 | Adam | 119/728 |
| 4,343,266 | 8/1982 | Moeller | 119/728 |
| 4,378,759 | 4/1983 | Garrett | 119/728 |

FOREIGN PATENT DOCUMENTS

| | | | |
|---|---|---|---|
| 2825664 | 12/1979 | Germany | 119/728 |
| 1230563 | 5/1986 | U.S.S.R. | 119/755 |
| 9109516 | 7/1991 | WIPO | 119/728 |

*Primary Examiner*—Todd E. Manahan
*Attorney, Agent, or Firm*—Rhodes, Coats & Bennett

[57] ABSTRACT

A pig holder designed to support pigs by their hind legs while performing operations on the pig or while giving treatment to the pig, includes a support frame which mounts to the rails of a ferring crate. A leg holder assembly including two pairs of hooks are secured to the support frame for engagement with the pig's hind legs. Each pair of hooks is adapted to engage with a respective hind leg of the pig and includes one upwardly facing hook and one downwardly facing hook. The spacing between the first and second pairs of hooks may be adjusted to accommodate pigs of different size or to spread the hind legs of the pig to permit access to the pig's abdomen.

11 Claims, 3 Drawing Sheets

PIG HOLDER

FIELD OF THE INVENTION

The present invention relates generally to devices used in the production of pigs, and, more particularly, to a device for holding pigs while performing operations or giving treatment to pigs.

BACKGROUND OF THE INVENTION

In order to promote growth, male pigs are normally castrated within 10–15 days of birth. It normally takes two persons to perform a castration. One person grasps and holds the young pig by its hind legs while the other performs the castration. Even with two persons, holding the pigs while performing the castration can be awkward and cumbersome.

In the past, it is known to use a pig holding device to hold the pig while performing operations on them or giving them treatment. For example, the patent to Moeller, U.S. Pat. No. 4,343,266, discloses a pig holding device for holding a pig by its hind feet. The holding device includes a pair of V-shaped members for suspending the pig by its hind legs. The V-shaped configuration of the members causes the pigs legs to be grasped in response to the downward force of gravity on the pig. U.S. Pat. No. 3,693,595 to Stewart also discloses a pig holding device for holding a pig by its hind legs. This device uses a pair of jaw members for grasping the pigs hind legs. The spacing between the jaw members is adjustable for animals of different sizes.

These prior art devices are either too cumbersome to use or do not adequately support the pig. Thus, these devices are not currently in use in most hog production facilities.

SUMMARY AND OBJECTS OF THE INVENTION

The present invention is a pig holder for holding pigs while giving treatment or performing operations. The pig holder includes a support frame having means for mounting the support frame to a ferring crate. A leg holder assembly is mounted on the support frame for holding a pig by its hind legs. The leg holder assembly includes a pair of spaced apart hook members. Each hook member includes a pair of hooks for engaging respective hind legs of the pig. The hooks of the rearward hook member are pointed downwardly, while the hooks of the forward hook member are pointed upwardly. When the pigs hind legs are placed in the hook members, the force of gravity acting on the pig rotates the hind legs against the rearward hook members to retain the pig within the holder.

In the preferred embodiment of the invention, a second set of leg holders are mounted on the frame. The second leg holder also includes two pairs of hooks. However, in the second leg holder, each set of hooks is mounted on a separate telescoping support so that the spacing between the hooks can be adjusted by simply sliding the support. This enables the pig's legs to be spread apart to permit access to the pig's abdomen.

The present invention may also include a support plate for use in conjunction with each leg holder assembly. The support plate mounts to the support frame immediately below the leg holder assembly and is adapted to bear against the belly or back of the pig. A retaining strap extends around the pig and has its ends secured to the support plate for holding the pig against the support plate.

DETAILED DESCRIPTION OF THE INVENTION

Figure 1:
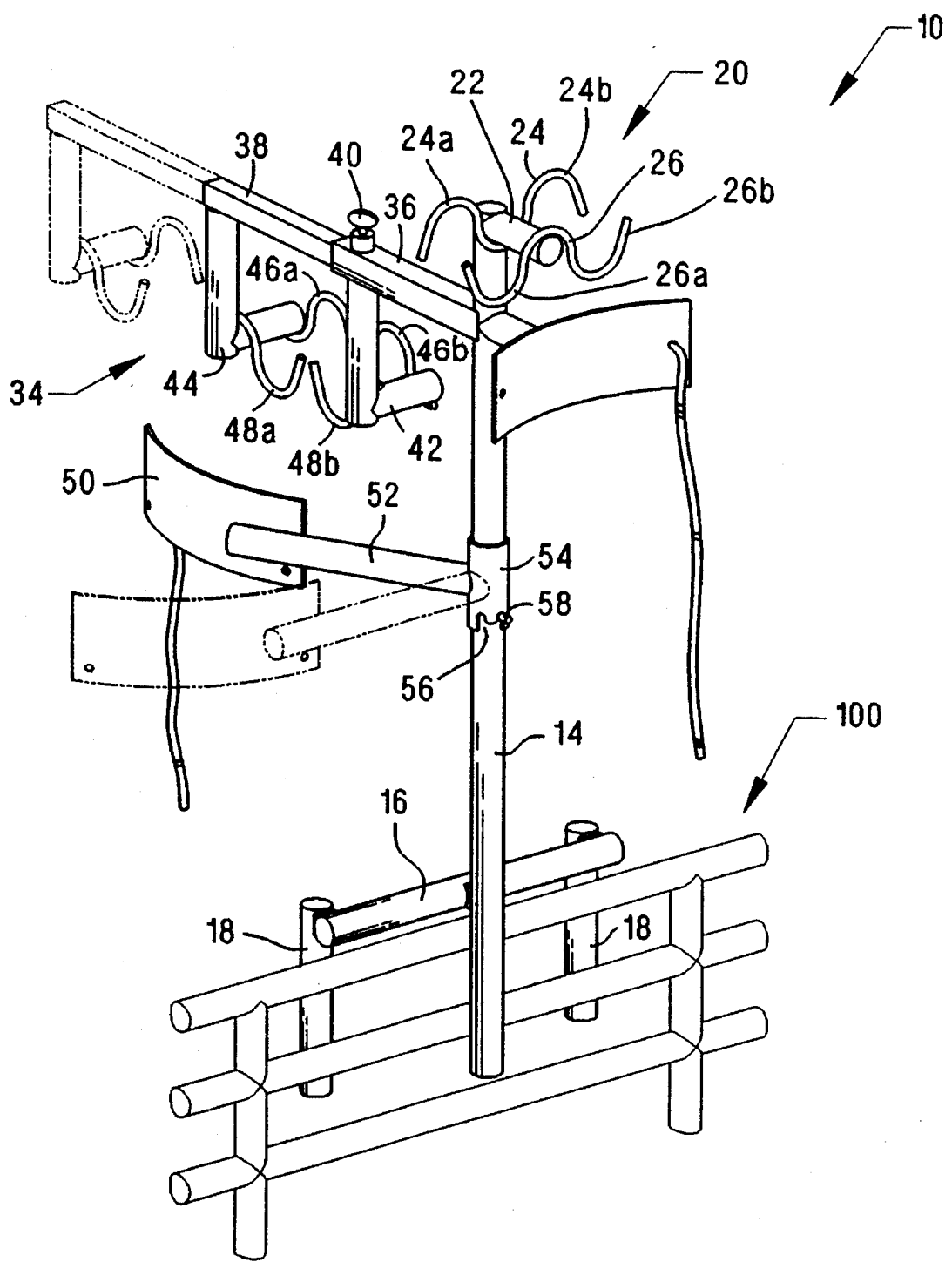
FIG. 1 is a perspective view of the pig holder of the present invention.

Referring now to the drawings, the pig holder of the present invention is shown therein and indicated generally by the numeral 10. The pig holder is designed to mount directly to the rails of a ferring crate 100 and supports the pig by its hind legs.

The pig holder 10 includes a support frame 12 and two leg holder assemblies 20 and 34 which are mounted on the support frame. Mounting means are provided at the lower end of the support frame 12 for mounting the pig holder 10 to the rails of the ferring crate 100. The mounting means includes a crossbar 16 secured at its center to the support post 14 and a pair of downwardly extending fork members 18. The crossbar 16 is disposed at 90° to the support post 14. The fork members 18 extend downwardly from the crossbar 16 at opposite ends thereof. The fork members 18 are disposed on the opposite side of the crossbar 16 from the support post 14. The rails of the ferring crate 100 are received in the gap between the lower end of the support post 14 and fork members 18 as most clearly seen in FIG. 2. Thus, the lower end of the support post 14 functions as a third fork member.

A leg holder assembly 20 is secured to the upper end of the support post 14. The leg holder assembly 20 includes a stub member 22 which projects forwardly from the support post 14. A pair of hook members 24 and 26 are secured to the stub member 22 in spaced relation to one another. Hook member 24 includes a pair of downwardly facing hooks 24a and 24b which are integrally formed from a single piece of wire. Similarly, hook member 26 includes a pair of upwardly facing hooks 26a and 26b formed from a second single piece of wire. Hooks 24a and 26a are adapted to engage one of the pig's hind legs while hooks 24b and 26b engage the other hind leg. Hooks 26a and 26b engage the front side of the pig's hind legs while hooks 24a and 24b engage the back side of the pig's hind legs. Thus, the pig is retained solely by the force of gravity within the leg holder 20.

A support plate 28 is mounted to the support post 14 for use in connection with the first leg holder assembly 20. The support plate 28 is mounted to the end of a support rod 30 extending from the support post 14. The support plate 28 has a curved surface which is adapted to engage the pig's belly. A retaining cord 32 extends around the pig and has its ends engaged with the support plate 28 to hold the pig firmly against the support plate 28. The support plate 28 has a pair of openings at each end thereof. The cord 32 is inserted through the opening and tied into a knot to hold the pig against the support plate 28.

A second leg holder assembly 34 is mounted to the support frame 12. The leg holder assembly 34 includes a horizontal support member 36 which extends at a right angle from the support post 14. A slide bar 38 is slidably received in the horizontal support member 36. A securing screw 40 tightens against the slide bar 38 to secure the slide bar 38 in a fixed position relative to the horizontal support member

36.

A pair of L-shaped hook supports 42 and 44 extend downwardly from the horizontal support member 36 and slide bar 38 respectively. A first set of downwardly facing hooks 46a and 46b are secured to hook supports 44. A second set of upwardly facing hooks 48a and 48b are secured to hook supports 42 in spaced relation to the first set of hooks 46a and 46b. The hooks 46a and 48a are adapted to engage one of the hind legs of the pig. Hooks 46b and 48b are adapted to engage the other hind leg. The hind legs of the pig are engaged with the hooks in the same manner as previously described. Further, by adjusting the slide bar 38, the pig's hind legs can be spread apart to permit access to the pig's abdomen.

A second support plate 50 is pivotally mounted to the support post 14 for use in connection with the second leg holder assembly 34. Support plate 50 is adapted to engage the back of the pig in a manner similar to the way the first support plate 28 engages the belly of the pig. The support plate 50 is mounted on a support rod 52 which is attached to a sleeve 54. The sleeve 54 has a pair of notches 56 which engage a peg 58 on the support post 14 to retain the support plate in either of two positions.

Prior to inserting a pig into the leg holder assembly 34, the support plate 50 is moved to the position shown in dotted lines in FIG. 1 while the pig is inserted into the leg holder assembly 34. Once the pig's hind legs are engaged in the leg holder assembly 34, the support plate 50 is swung to a use position in which the plate 50 engages the back of the pig. A cord 60 extends around the belly of the pig and has its ends engaged with the support plate 50 to hold the back of the pig against the support plate 50.

To use the pig holder of the present invention, it is first mounted to ferring crate 100 by inserting the rails of the ferring crate between the support posts 14 and fork members 18. It will be apparent that the pig holder can be mounted in one of two ways, depending on which leg holder assembly it is desired to use. If it is desired to use the first leg holder assembly 20, the pig holder 10 is mounted to the ferring crate 100 with the support plate 28 pointed toward the aisle. Conversely, if it is desired to use the second leg holder assembly 34, the pig holder 10 is mounted to the ferring crate 100 with the support plate 28 pointed away from the aisle. In either case, the pig holder 10 is mounted to the ferring crate by holding it above the ferring crate 100 and then lowering it onto the rails of the ferring crate 100.

Figure 2:
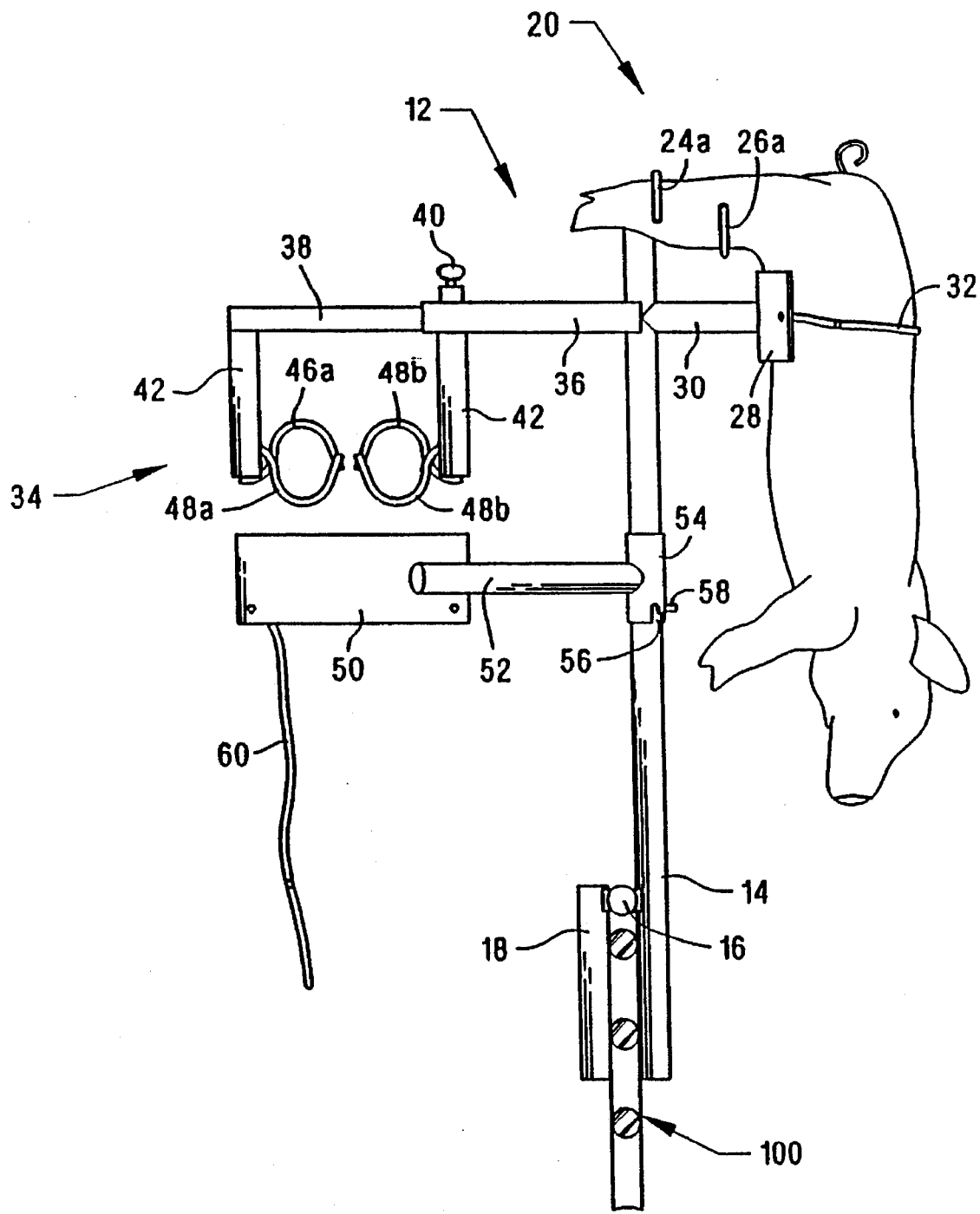
FIG. 2 is an elevation view of the pig holder with a pig held in the first leg holder assembly.

Once the pig holder 10 is mounted to the ferring crate 100, the hind legs of the pig are inserted into the leg holder assembly 20 or 34. If the first leg holder assembly 20 is used, the hind legs of the pig are inserted into the hook members 24 and 26 as shown in FIG. 2. The belly of the pig should bear against the support plate 28. Once the pig's hind legs are inserted into the holder 10, the castration or other operation is performed. It is not necessary that the retaining cord 32 be used, although the retaining cord 32 is offered as an additional safety measure to assure that the pig does not slip out of the holder.

Figure 3:
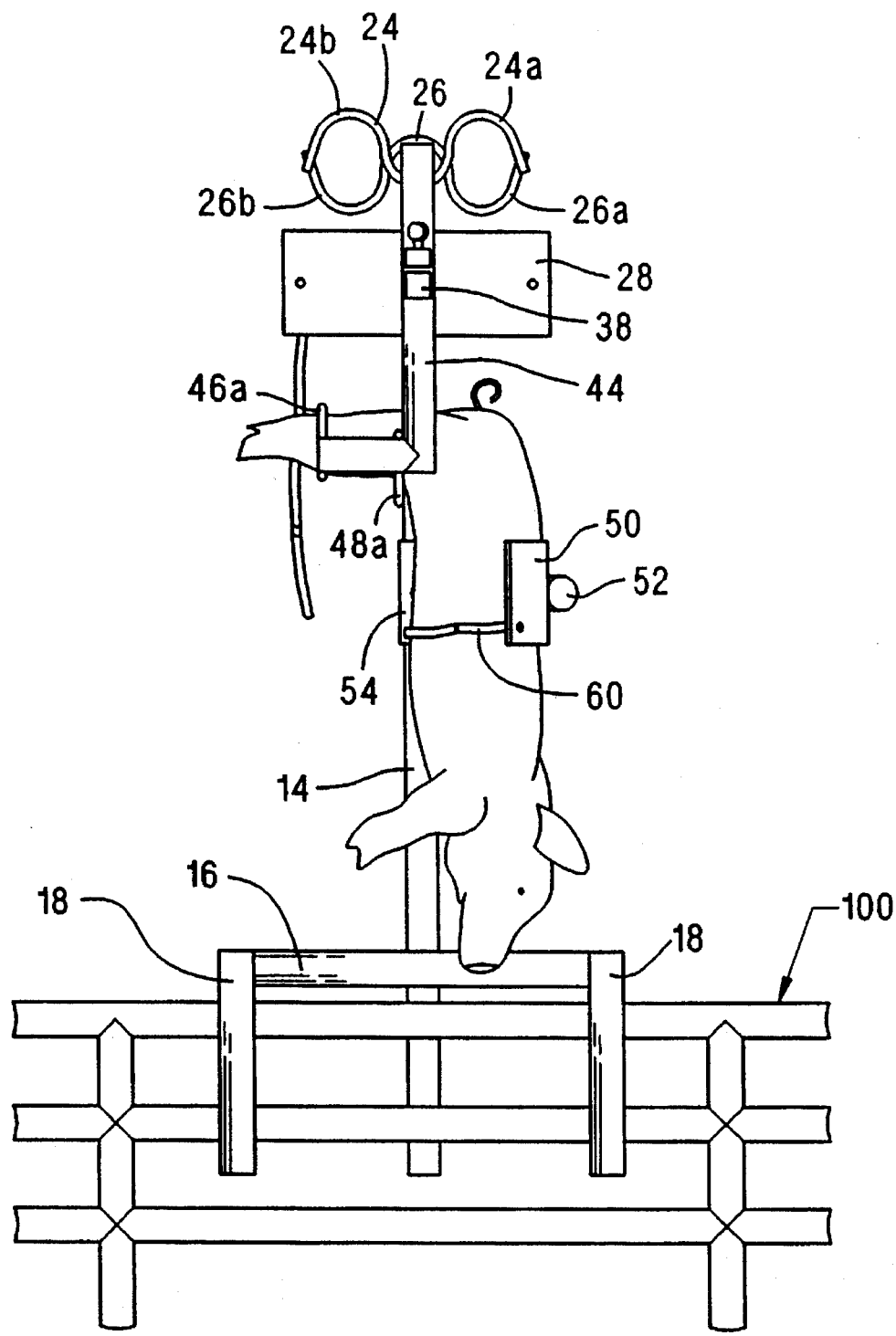
FIG. 3 is an elevation view of the pig holder with a pig held in the second leg holder assembly.

The second leg holder assembly is used essentially in the same manner as the first leg holder assembly 20. The pig's hind legs are inserted through the hooks 46a, 46b, 48a and 48b as shown in FIG. 3. After the pig's hind legs are inserted, the support plate 50 is swung into position against the back of the pig and the retaining cord 60 is tied. After the pig is inserted into the holder, the pig's hind legs can be spread by loosening the tightening screw 40 and sliding the slide bar 38 outwardly.

The pig holder 10 of the present invention provides a relatively easy and convenient method of holding a pig while performing operations. Since the pig holder 10 mounts directly to the ferring crate 100, it can be used even in hog houses having relatively narrow aisles. Further, the pig holder is relatively small in size so they can be easily stored in a small space.

An additional advantage of pig holder 10 is that it enables a single person to perform the job which is normally performed by two individuals. The person performing the operation on or giving the treatment to the pig can easily and quickly place the pig within the holder and then perform the procedure. The pig can then be easily and quickly removed. Thus, the pig holder 10 can result in a significant decrease in labor costs associated with such operations.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A pig holder comprising:
   (a) a support frame;
   (b) mounting means engagable with the rails of a ferring crate for mounting the support frame to the ferring crate;
   (c) a leg holder assembly secured to the support frame for holding a pig by its hind legs, said leg holder assembly including two sets of hooks disposed in side-by-side relationship for engagement with respective hind legs of the pig, each said sets of hooks including a first upwardly disposed hook for engaging one side of the pig's hind legs and a second downwardly disposed hook spaced from said first hook for engaging the opposite side of the pig's hind legs such that the pig is retained in the hooks by gravity;
   (d) a support plate mounted to the support frame adjacent to the leg holder assembly for engagement with the body of the pig, wherein the support plate is pivotally mounted to the support frame so as to be movable between a first position to permit placement of the pig within the leg holder assembly, and a second position in which the support plate is in contact with the pig; and
   (e) a retaining strap for extending around the body of the pig to hold the pig in contact with the support plate.

2. The pig holder of claim 1 further including adjustment means for adjusting the distance between said first and second sets of hooks.

3. The pig holder of claim 1 wherein the adjustment means comprises first and second telescoping members forming a part of the support frame, said first and second sets of hooks being suspended from respective telescoping members.

4. The pig holder according to claim 1 further including locating means for locating the support plate in its first and second positions.

5. The pig holder of claim 1 wherein the mounting means comprises a fork assembly disposed at a lower end of the support frame, said fork assembly including at least three downwardly extending fork members.

6. A pig holder comprising:
   (a) a support frame;
   (b) a leg holder assembly secured to the support frame for holding a pig by its hind legs, said leg holder assembly including two pairs of hooks for engagement with respective hind legs of the pig, each said pair of hooks including a first upwardly disposed hook for engaging one side of the pig's hind legs and a separate downwardly disposed hook spaced from said first hook for engaging the opposite side of the pig's legs such that the pig is retained in the hooks by gravity;

(c) adjustment means for adjusting the spacing between said first and second sets of hook;

(d) a support plate mounted to the support frame adjacent to the leg holder assembly for engagement with the body of the pig, wherein the support plate is pivotally mounted to the support frame so as to be movable between a first position to permit placement of the pig within the leg holder assembly, and a second position in which the support plate is in contact with the pig; and (e) a retaining strap for extending around the body of the pig to hold the pig in contact with the support plate.

7. The pig holder of claim 6 wherein the adjustment means comprises first and second telescoping members forming a part of the support frame, said first and second sets of hooks being suspended from respective telescoping members.

8. The pig holder according to claim 6 further including locating means for locating the support plate in its first and second positions.

9. A pig holder comprising:

(a) a support frame;

(b) a leg holder assembly secured to the support frame for holding a pig by its hind legs, said leg holder assembly including:

(1) a stationary support member secured to the support frame;

(2) a telescoping member telescopically received by the stationary support member;

(3) a first let engaging means mounted to the stationary support member for engagement with one hind leg of the pig;

(4) a second leg engaging means mounted to the telescoping support member so as to be disposed in side-by-side relation with the first leg engaging means for engagement with the other hind leg of the pig such that the hind legs of the pig are spreadable by extending the telescoping support member relative to the stationary member; and (c) a support plate mounted to the support frame adjacent to the leg holder assembly for engagement with the body of the pig, wherein the support plate is pivotally mounted to the support frame so as to be movable between a first position to permit placement of the pig within the leg holder assembly, and a second position in which the support plate is in contact with the pig.

10. The pig holder of claim 9 wherein the first and second leg engaging means each include a set of hooks.

11. A pig holder comprising:

(a) a support frame;

(b) a first leg holder assembly secured to the support frame for engaging and holding a pig by its hind legs;

(c) a first support plate mounted to the support frame adjacent to said first leg holder assembly for engaging the belly of a pig held in said first leg holder assembly;

(d) a second leg holder assembly secured to the support frame for engaging and holding the pig by its hind legs; and (e) a second support plate mounted to the support frame adjacent to said second leg holder assembly for engaging the back of a pig held in said second leg holder assembly.

* * * * *